United States Patent [19]

Frost

[11] 3,858,506

[45] Jan. 7, 1975

[54] COLOR BAR PRINTER

[75] Inventor: Marvin D. Frost, Dayton, Ohio

[73] Assignee: NCR Corporation, Dayton, Ohio

[22] Filed: Mar. 30, 1973

[21] Appl. No.: 346,430

[52] U.S. Cl. ...................... 101/45, 101/99, 101/426

[51] Int. Cl. ................................................ B41j 7/08

[58] Field of Search............. 101/95, 99, 93 C, 110, 101/45, 426; 235/61, 12; 250/219

[56] References Cited

UNITED STATES PATENTS

| | | | |
|---|---|---|---|
| 3,223,033 | 12/1965 | Sundblad | 101/110 X |
| 3,309,987 | 3/1967 | Pexton | 101/110 X |
| 3,318,430 | 5/1967 | Boyd | 101/110 X |
| 3,413,922 | 12/1968 | Hike | 101/45 X |
| 3,515,060 | 6/1970 | Barbour | 101/45 |
| 3,709,144 | 1/1973 | Sims | 101/45 |

*Primary Examiner*—Robert E. Pulfrey
*Assistant Examiner*—Edward M. Coven
*Attorney, Agent, or Firm*—J. T. Cavender; Wilbert Hawk, Jr.; Richard W. Lavin

[57] ABSTRACT

A color bar code printer for printing on a tag member a plurality of contiguous color bars representing coded information including a plurality of set-up dials having digit information displayed on their edges, each digit being displayed with a plurality of color bar indicia displayed adjacent thereto, the dials being set to display the information to be encoded with adjacent matching color bar indicia, means for positioning selecting plates commensurate with the position of a corresponding set-up dial, the selecting plates having control surfaces located thereon, sensing means for sensing the position of the control surfaces on the selecting plates, and a plurality of color bar type wheels settable under the control of the sensing means to print on a tag member coded color bars representing the information set up on the dials.

13 Claims, 4 Drawing Figures

Patented Jan. 7, 1975 3,858,506

4 Sheets-Sheet 1

COLOR BAR PRINTER

BACKGROUND OF THE INVENTION

The present invention is directed to a low-cost printer for printing on merchandise tag members a plurality of color bar indicia representing coded information. As disclosed in paragraphs 2 and 3 of the U.S. Pat. No. 3,637,993 issued on Jan. 25, 1972 to J. B. Christie, et. al. and assigned to the assignee of the present application, the merchandise tag has printed thereon a plurality of detectable indicia like color bars positioned in a reading order so that each color bar is different from the preceding one. The color transitions from one color bar to the next, when reading, are used to identify binary states 1 and 0. In the reading of the merchandise tag, the color bars on the tag are read by a hand-held, optical probe scanner which is "squibbed" of glides across the color bars on the merchandise tag. The information in the form of binary bits resulting from this reading of the merchandise tag by the scanner is transmitted to a data collection source or an electronic cash register as part of the merchandise transaction.

The merchandise tags are normally printed at a central location utilizing sophisticated, high-speed printing equipment, from which the tags are sent to the store for attachement to the merchandise. There has arisen situations where due to a sale or other type of merchandise activity, the information on the tag is required to be altered. To print information on a tab using the color bar code described in the above-cited U.S. Patent requires the information to be first converted into binary code and then into the color bar code, the selection of the color bars dependent on the selection of the color of the first color bar. It is obvious that if one were to do this manually, it would be quite tedious and time consuming. This situation has created a demand for a low-cost, simple bar code printer where speed of operation is not a requirement.

SUMMARY OF THE INVENTION

It is therefore an object of this invention to provide a color bar printer which is low in cost, portable and simple in operation. In carrying out these objects there is provided a color bar printer which includes a plurality of set-up dials having edge-mounted numerical indicia represented in multiple coded arrangement with bracketed color bars, the dials being set to represent the numeral information to be presented together with matching adjacent color bars. Also included in the printer are a plurality of selecting plates, each plate being set to a position commensurate with the position of an associated set-up dial, each selecting plate having a plurality of control surfaces located thereon, sensing fingers for sensing the control surface of the adjusted selecting plates, and type wheels for printing different color bars on a merchandise tag, the type wheels being set under the control of the sensing fingers when sensing the control surface on the adjusted selecting plates.

DESCRIPTION OF THE PREFERRED EMBODIMENT

Figure 1:
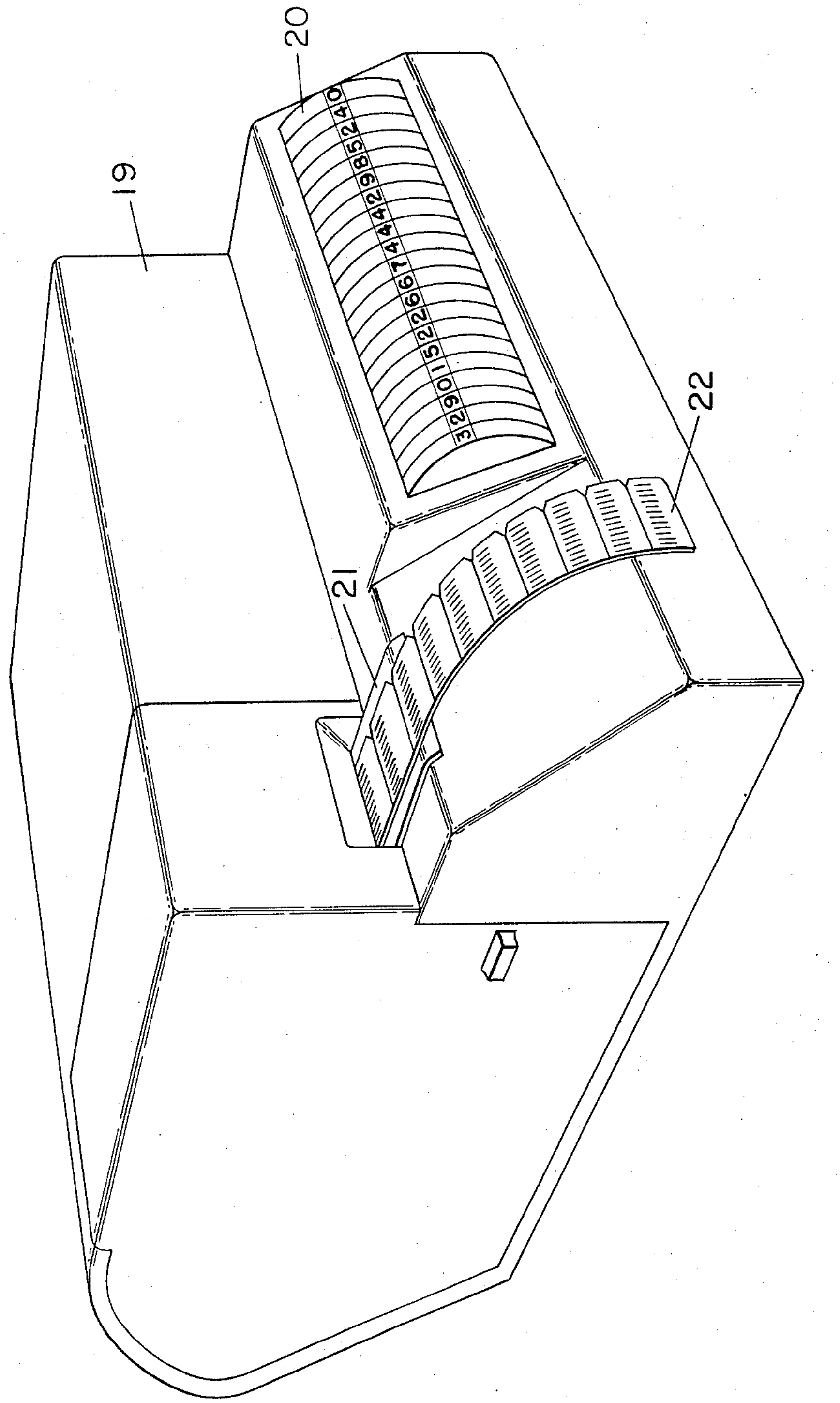
FIG. 1 is an oblique view of the color bar code printer showing the set-up dials and a strip of merchandise tag printed with color bars.

Referring to FIG. 1, there is shown a view of the color bar tag printer 19 which includes a plurality of rotatably-mounted set-up dials 20 positioned in a side-by-side arrangement in the front portion of the printer 19. Located on left front portion of the printer 19 is a table 21 on which the printed merchandise tags 22 move from the printer section of the tag printer. The merchandise tags have printed thereon a plurality of black, green and white contiguous color bars representing coded information. As disclosed more fully in U.S. Pat. No. 3,671,722 issued on June 20, 1972 to J. B. Christie, and which is assigned to the assignee of the present application, the tags are read by an optical probe scanner which is "scribed" across the color bars, each color bar being different from the preceding one, with the changing light signals providing electrical signals which are decoded and processed as part of a merchandising operation. The signals generated by the optical probe scanner represent the binary bits 1 or 0 in the order to constitute binary digits which in turn represent information such as the price of the article being sold, the department and the store from which it came, and a number specific to that article. Each transition from one color to another color will generate a signal indicating a binary bit 1 or a 0. As disclosed in paragraph 5, lines 25–75 and paragraph 6, lines 1–52 of the above-cited U.S. Pat. No. 3,671,722, in the color bar code using white, black and green as the colors, a 1 bit may be represented by the transitions from a green bar to a white bar, from a white bar to a black bar or from a black bar to a green bar. A "0" bit is represented by the transition from a white bar to a green bar, a green bar to a black bar or from a black bar to a white bar. Since the code is dependent on the transition between adjacent color bars and, as described above, the same binary bit can be represented by the transition between any one of three color bar combinations, the selection of the first color bar of the first character will determine the color of each succeeding color bar.

Figure 2:
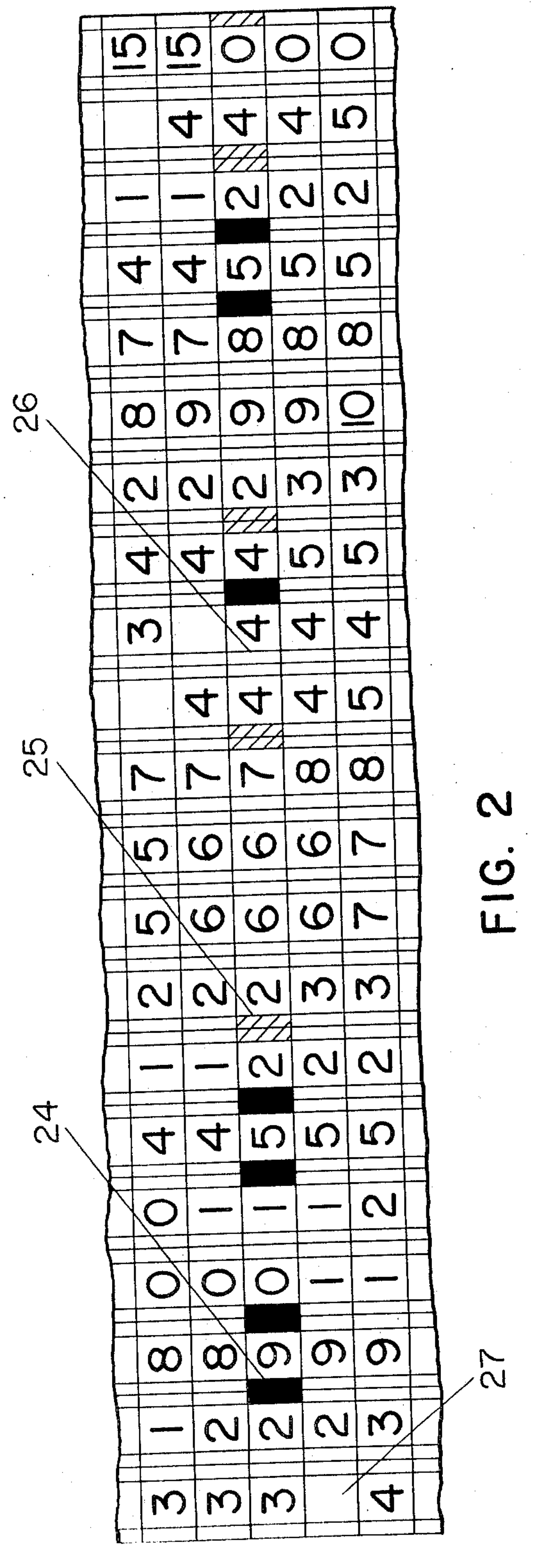
FIG. 2 is a schematic representation of a portion of the numerical indicia located on the edge of the set-up dials, the dials being set so that adjacent color bars on the slected numerical indicia are of the same color.

As shown more clearly in FIG. 2, each of the setup dials 20 has located on its edge consecutive sets of the numerical characters 0–15 inclusive with each set comprising three characters of the same denomination. Each character in each set is bracketed by a pair of color bars 23, each color bar being one of three colors, namely, white, green or black. Each set-up dial 20 is identical in its arrangement of the characters and their associated color bar combination. The color bar arrangement associated with each of the 16 characters is given in the following Table I.

Table I

| | | | |
|---|---|---|---|
| 0 | W/G | G/B | B/W |
| 1 | B/G | W/B | G/W |
| 2 | B/G | W/B | G/W |
| 3 | B/B | G/G | W/W |

Table I-Continued

| | | | |
|---|---|---|---|
| 4 | W/B | G/W | B/G |
| 5 | W/W | G/G | B/B |
| 6 | W/W | G/G | B/B |
| 7 | W/G | G/B | B/W |
| 8 | W/B | G/W | B/G |
| 9 | B/B | W/W | G/G |
| 10 | W/W | G/G | B/B |
| 11 | W/G | G/B | B/W |
| 12 | W/W | G/G | B/B |
| 13 | W/G | G/B | B/W |
| 14 | W/G | B/W | G/B |
| 15 | G/W | B/G | W/B |

Figure 3:
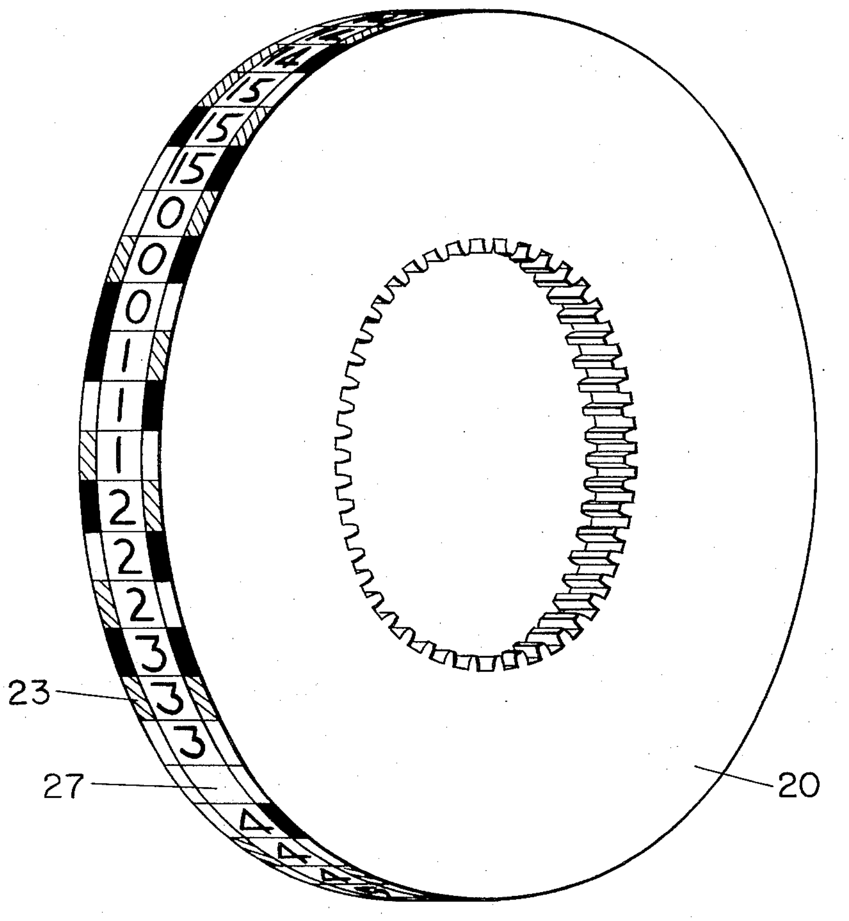
FIG. 3 is an oblique view of one of the set-up dials showing the various numerical indicia and their associated color bar combinations.

The color bars indicated in Table I are so arranged such that the operator will set up the first character of the data that is to be encoded by selecting only the characters and using any of the three color bar combination. The operator then sets up the remaining characters of the data utilizing the set-up dials but selecting the appropriate character so that the color bar adjacent the preceding set-up dial selected will match the preceding color bar. An example of this type of set-up is shown in FIG. 2. As shown, the black bars 24, the green bars 25 and the white bars 26 are matched with each succeeding character. This construction and operation of the set-up dials allows the requirements of the color bar code described previously with respect to the patents to Christie, Pat. No. 3,671,722 to be met, that is, the selection of one of three colors for the first color bar will determine the color of each succeeding color bar that will represent the data in the color bar code. In order to provide the minimum number of color combinations for the sixteen characters that are displayed on the set-up dial, a blank space 27 (FIGS. 2 and 3) is positioned between the third and fourth character position on the dial. As will be described more fully hereinafter, use of the color bars with each character on the set-up dial 20 in accordance with Table I allows the printing of data in the form of a three color bar transitional code on a merchandise tag to be set up by merely setting the set-up dials 20 to indicate the data to be printed with matching color bars adjacent the characters so selected in the manner described above. Each character position of the dial will control the setting of type wheels from which color bars are printed in a sequence to represent the characters on the dial in the form of a complex three color bar transition code as disclosed in the previously cited Christie Pat. No. 3,671,722.

Figure 4:
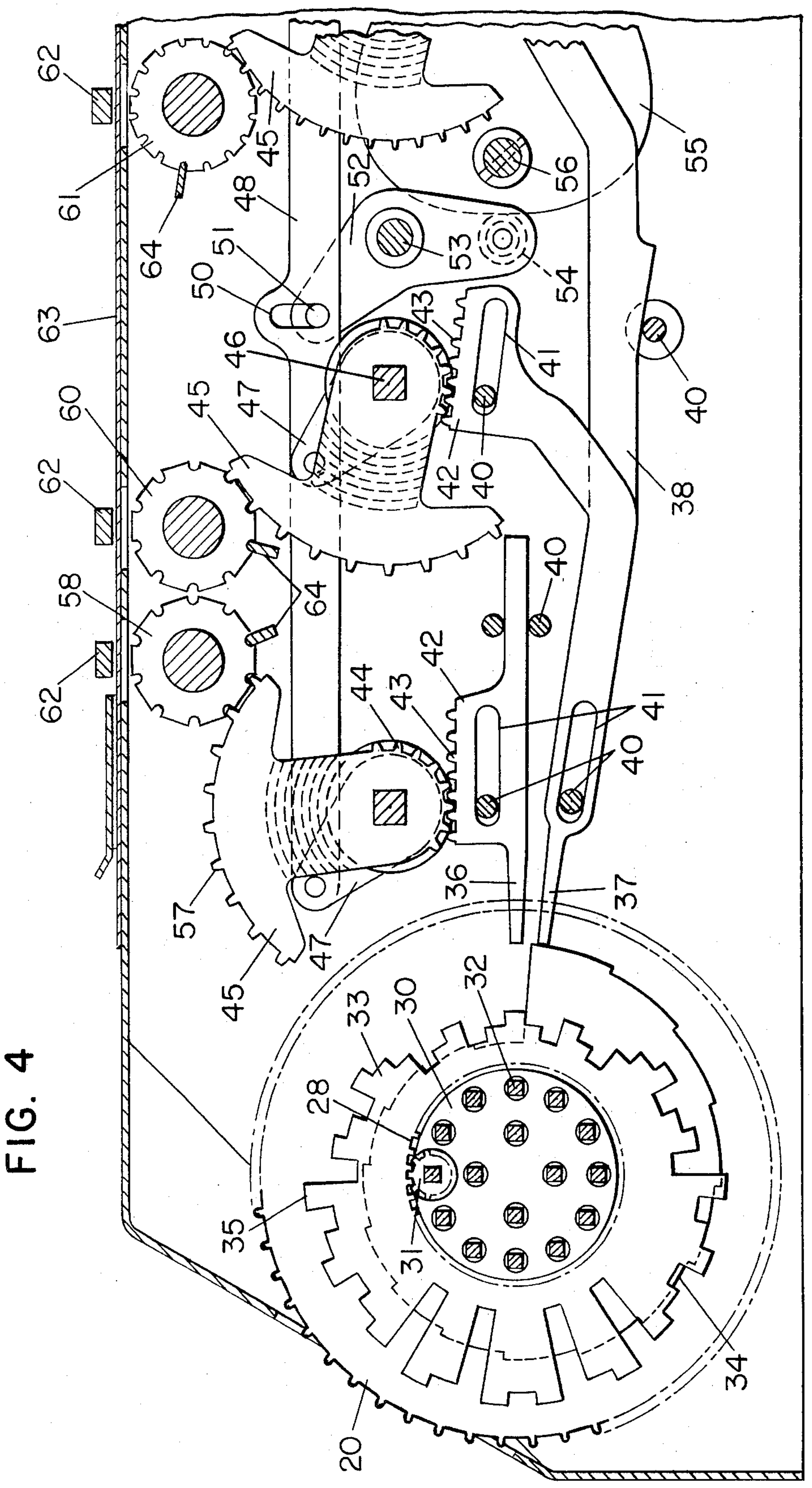
FIG. 4 is a partial side view of the selecting plates, the feeler fingers and its associated drive mechanism and the type wheels used in the color bar code printer.

Each of the set-up dials 20 has a plurality of internal gear teeth similar to the internal gear teeth 28 shown in FIG. 4, the set-up dial being rotatably supported on a disc similar to the disc 30 shown in FIG. 4. The internal gear teeth 28 of each dial engages a pinion gear similar to the gear 31 shown in FIG. 4 which is secured to a transmission shaft member 32 which member extends lengthwise across the width of the printer. Rotation of the dial 20 will result in a similar rotation of the shaft 32 to a position commensurate to the adjusted position of the dial. Each shaft 32 has secured on its other end a pinion gear 31 (FIG. 4) which engages the internal teeth 28 of a pair of selecting plates 33, 34 rotatably supported on the disc 30. It will be seen from this construction that positioning of the set-up dial 20 will position the associated selecting plates 33, 34 to a position commensurate with the position of the adjusted set-up dial.

As shown in FIG. 4, each of the selecting plates 33, 34 has a plurality of control surfaces 35 which are positioned at different radii of the plates. Associated with the selecting plates 33, 34 are three feeler members 36, 37, 38 slidable mounted on shafts 40 secured to the machine framework. The shaft 40 extends through slots 41 located in the feeler member. As shown in FIG. 4, the feeler members 36, 37 are mounted in the same vertical plane while the feeler member 38 is positioned adjacent the feeler member 37.

Each of the feeler members 36–38 inclusive has an upright portion 42 on which are located a plurality of gear teeth 43. The gear teeth 43 are in mesh with a gear member 44 secured to a gear segment 45 which has a number of teeth 57 which engage an associated type wheel to be described more fully hereinafter. Both the gear segment 45 and the gear member 44 are connected by means of a slip clutch (not shown) to a shaft 46 rotatably mounted within the machine framework. Secured to the shaft 46 is a drive arm 47 interconnected by a link member 48 slidably mounted within the machine framework.

The link member 48 has a slot 50 within which is slidably located a stud 51 mounted on one end of a cam follower arm 52 which in turn is rotatably supported on a stud 53 secured to the machine framework. Rotatably mounted on the other end of the arm 52 is a cam roll 54 which engages the edge of a cam member 55 pinned to a cam shaft 56. As will be described more fully hereinafter, clockwise rotation of the cam 55 will rock the gear 45 first in a clockwise direction as viewed in FIG. 4 through the clockwise rotation of the cam follower arm 52, the movement of link member 48 and the clockwise rotation of the driven arm 47, and then in a counter-clockwise direction.

As shown in FIG. 4, the feeler member 36, through the gear segment 45, controls the positioning of a plurality of rotatably mounted type wheels 58, the feeler member 37 controls type wheels 60 while feeler member 38 controls type wheels 61. The type wheels 61 print human readable characters while the type wheels 58 will print black bars and type wheels 60 will print green bars. Associated with each of the type wheels are print hammers 62 which are actuated to print from the type wheels on a merchandise tag positioned on a table 63 which is shiftable between two positions.

In the operation of the printer, the operator will set up the numerical data which is to be encoded on the tags by manually positioning the first set-up dial 20 to display the first character of the data. The operator can select any one of the three color bar patterns associated with the first character. After this set-up dial has been positioned, each succeeding set-up dial is set to display the proper character by selecting the character having a color bar which matches the adjacent color bar of the preceding set-up dial. It is obvious that indicia other than the color bars 23 can be used to identify each character position on the dial so that they can be aligned in the manner described previously. Positioning of the set-up dials 20 will position the corresponding selecting plates 33, 34 by means of the pinion gear 31 and shaft 32. The positioning of the selecting plates 33, 34 will position one of the control surfaces 35 to be sensed by the feelers 36, 37 which in turn positions the type wheel 58, 60 and 61. Thus the positioning of the set-up dials is converted to the color bar transition code disclosed in the previously cited Christie Pat. No. 3,671,722.

After the set-up dials 20 have been adjusted to display the information to be encoded, the cam drive shaft 56 is operated to rotate each of the segments 45 in a clockwise direction resulting in the movement of the feeler members 36, 37 and 38 to the left as viewed in FIG. 4. This movement will allow the feeler members to sense a control surface 35 of the adjusted selecting plates, the control surfaces that are sensed controlling the length of movement of the feeler members. This movement of the feeler members will position the type wheels 58, 60 and 61 according to the length of movement of the feeler members in sensing the control surfaces. Since each of the gear segments 45 is connected to the drive arm 47 by means of a slip clutch, if one of the feeler members engages a control surface before the other feeler members do, the gear segment 45 will stop but the drive arms 47 will continue their clockwise movement as determined by the configuration of the cam 55. After the drive arms 45 have completed their clockwise movement, the cam shaft 56 is stopped. Type wheel aligner bars 64 are then moved into engagement with the adjusted type wheels locking the type wheels in place.

The merchandise tags will then be transported past the hammers 62 which are actuated to print human readable characters on the tag by means of the type wheel 61, green bars by means of type wheel 60 and black bars 58 by means of a type wheel 58. After the required number of merchandise tags have been printed and dispensed from the printer, the aligner bars 64 will be withdrawn from the type wheels and the cam shaft 56 will continue its rotation to its home position resulting in the cam 55, through the action of the cam follower arm 52 and the link member 48, rocking the drive arm 47 and the gear segment 45 in a counterclockwise direction. This movement of the gear segments will withdraw the feeler members 36–38 inclusive from engagement with the selecting plates 33, 34 thus conditioning the printer for a new printing operation.

It will be seen from the construction that by aligning the set-up dials so that adjacent color bars on the set-up dials are matched, the merchandise tags will be printed with the proper color bar arrangement to represent the data in a color bar transition code which can be read by optical means and processed electronically.

What is claimed is:

1. An apparatus for printing data in the form of coded indicia on a record medium having a plurality of print locations comprising:

a. a plurality of settable indicator wheels positioned in a side-by-side relationship each indicator wheel having displayed on its edge a plurality of groups of character of data, each group of characters comprising the same character and wherein each character is bracketed by coded indicia, each of the indictor wheels being positioned to display the character representing the data to be printed on the record medium with each of the coded indicia that bracket the selected character on each indicator wheel matching the coded indicia on adjacent indicator wheels;

b. a plurality of first settable code converting means operatively associated with each indicator wheel, said code converting means settable to a position commensurate with the position of its associated indicator wheel;

c. a plurality of control surfaces positioned on each of said first code converting means;

d. a plurality of printing elements having printing surfaces thereon for printing coded indicia on a record medium;

e. sensing means positioned adjacent said first code converting means, said sensing means mounted for movement in the same plane as said control surfaces;

f. movable means interconnecting said sensing means and said printing elements to position said printing elements commensurate with the length of movement of said sensing means;

g. and drive means engaging said interconnecting means for moving, when operated, said interconnecting means, said sensing means and said printing elements whereby the printing elements are positioned commensurate with the movement of the sensing means in the sensing of a control surface on said code converting means.

2. The printing apparatus of claim 1 in which said coded indicia comprises colored bars, the indicator wheels being set to match the same colored bars of adjacent indicator wheels.

3. The printing apparatus of claim 1 which includes a. second code converting means secured to each of said first code converting means, said second code converting means having a plurality of second control surfaces positioned thereon;

b. a plurality of second printing elements having printing surfaces thereon for printing characters of data human readable form on a record medium;

c. second sensing means positioned adjacent said second code converting means for movement in the same plane as said second control surface; and d. second movable means interconnecting said second sensing means and said second printing elements, said second interconnecting means engaged by said drive means for operation thereby whereby said second printing elements are positioned commensurate with the length of movement of said second sensing means in sensing a second control surface on said second code converting means.

4. The printing apparatus of claim 3 in which said sensing means includes a sensing member having a rack portion located thereon;

b. said interconnecting means includes a rotatably mounted gear member, associated with each sensing member, said gear member engaging the rack portion of its associated sensing member;

c. a gear segment secured to each of said gear members and having a gear portion engaging an associated printing element, said gear segment engaging said drive means whereby upon operation of said drive means, said gear segment, said gear members and said sensing members are actuated to position the printing elements according to the control surface sensed by said sensing member.

5. The printing apparatus of claim 4 in which said drive means includes a. a cam actuated drive member;

b. an actuating member secured to each of said gear members; and c. linkage means slidably mounted adjacent said drive member and said actuating member, said linkage means engaging said cam actuated drive member and said actuating member whereby said drive member will rotate said actuating member when operated.

6. An apparatus for printing first and second coded indicia on a record medium;

a. a plurality of rotatably-mounted, manually-settable coded data indicator wheels each settable to a position to display, in coded form, the data to be recorded on the record medium;

b. a plurality of first movable code converting members associated with each of said indicator wheels, each of said code converting members having a plurality of predetermined located stop surfaces positioned thereon;

c. transmission means interconnecting each of said indicator wheels and its associated first code converting member for moving said code converting members to a position commensurate with the positioning of its associated indicator wheel;

d. rotatably mounted first and second printing elements having selectively positioned printing surfaces located thereon;

e. means associated with each of said first and second printing elements for printing first and second coded indicia from said printing elements respectively during a printing operation.

f. a plurality of first and second sensing members positioned adjacent each of said first code converting means, both of said sensing members being slidably mounted in the same plane as said stop surfaces, whereby movement of said sensing members will engage one of said stop surfaces;

g. means interconnecting each of said first and second printing elements with said first and second sensing members respectively, said interconnecting means mounted for movement to rotate said printing elements and move said sensing members in a sensing direction when actuated; and drive means engaging said interconnecting means during a printing operation whereby said first and second sensing members are moved to sense a stop surface on their associated first code converting members thereby positioning said printing elements for a printing operation.

7. The printing apparatus of claim 6 in which each of said indicator wheels has displayed on its edge sets of characters of data, each set representing a single character wherein each character is bracketed by coded indicia, the indicator wheels being set to display the data to be presented with each coded indicia adjacent each character matching the coded indicia on adjacent indicator wheels.

8. The printing apparatus of claim 7 in which said coded indicia comprises colored bars, the indicator wheels being set to display the data to be coded with matching colored bars on adjacent indicator wheels.

9. The printing apparatus of claim 7 which includes a. second code converting members secured to each of said first code converting members, said second code converting member having a plurality of second control surfaces positioned thereon;

b. a plurality of third printing elements having selectively positioned printing surfaces located thereon;

c. means associated with said third printing elements for printing characters of data in human readable form on a record medium;

d. a plurality of third sensing members positioned adjacent said second code converting members and slidably mounted for movement in the same plane as said second control surfaces; and e. second movable means interconnecting said third sensing member and said third printing elements, said second interconnecting means engaged by said drive means for operation thereby whereby said third printing elements are positioned for a printing operation commensurate with the length of movement of said third sensing member in sensing a second control surface on said second code converting members.

10. The printing apparatus of claim 9 in which a. said first, second and third members each has a rack portion located thereon; and b. said first and second interconnecting means includes a rotatably mounted gear member engaging the rack portion of an associated sensing member; and c. a gear segment secured to each of said gear members and engaging an associated printing element, said gear segment engaging said drive means whereby upon operation of said drive means, said gear segments, said gear members and said sensing members are actuated to position the printing elements according to the control surface sensed by said sensing members.

11. The printing apparatus of claim 10 in which said drive means includes a. a cam actuated drive member;

b. an actuating member secured to each of said gear members; and c. linkage means slidably mounted adjacent said drive member and said actuating member, said linkage means engaging said drive member and said gear member whereby said drive member will rotate said actuating member when operated.

12. A method for conditioning a printing mechanism for printing on a record medium coded information in the form of colored indicia, the printing mechanism includes a plurality of indicator wheels rotatably mounted in a side-by-side relationship, each wheel having displayed on its edge a plurality of sets of characters of data, each character in each set being of the same denomination and bracketed by colored indicia, comprising the steps of a. positioning the first indicator wheel to display the first character of the information to be printed; and b. positioning each succeeding indicator wheel to display the remaining characters of the information, the displayed character on each wheel having a colored indicia which matches the colored indicia of the displayed character of the preceding indicator wheel.

13. A method for positioning printing wheels of a printing mechanism for printing on a record medium colored indicia representing coded information comprising the steps of a. positioning indicator wheels having sets of the same character of information displayed on their edges, each character being bracketed by color indicia, the wheels being positioned to display the information to be printed with adjacent wheels having aligned matching color indicia;

b. positioning control wheels commensurate with the position of the indicator wheels, said control wheels having predetermined positioned sensing surface located thereon;
c. sensing the position of the adjusted control wheels by sensing a sensing surface on the control wheel; and
d. positioning the printing wheels in a printing position according to the sensing surface sensed.

* * * * *